Sept. 21, 1943.  W. L. CHURCH ET AL  2,329,981
DRILL STEM VALVE
Filed June 24, 1940

Inventors
WALTER L. CHURCH
WM. K. HOLLERON

By
E. V. Hardway,
Attorney

Patented Sept. 21, 1943

2,329,981

UNITED STATES PATENT OFFICE 2,329,981

DRILL STEM VALVE

Walter L. Church, Houston, and William K. Holleron, Victoria, Tex.

Application June 24, 1940, Serial No. 342,120

2 Claims. (Cl. 251—91)

This invention relates to a drill stem valve.

The invention contains certain improvements over that type of valve disclosed in United States Patent No. 2,176,730 issued October 17, 1939.

The valve is particularly adapted for connection into the grief joint of the drill stem and is provided for the purpose of closing the drill stem to protect the hose and pump valves, in case a blowout occurs during drilling operations.

In carrying on well drilling operations a cat line is employed for performing certain of the operations and is operated by a cat head forming a part of the drilling rig. The cat line is manipulated by a workman on the derrick floor and must be skillfully and carefully handled in order to avoid danger to the workmen handling the same. It is important that the line does not become entangled with or engaged by any projections on which it may hang while it is in use and one of the main objects is to provide a drill stem valve assembly having no external projections on which the cat line may hang while operations are being carried on.

It is another object of the invention to provide a drill stem valve having a valve casing that may be connected to the grief joint of the drill stem and whose external surface is comparatively smooth thus offering no external projections on which the cat line may hang and which at the same time is of such construction that the valve may be readily operated and that permits ready access to the working parts of the valve for repairs and replacements.

With the above and other objects in view the invention has particular relation to certain novel features of construction, operation and arrangement of parts, an example of which is given in this specification and illustrated in the accompanying drawing, wherein.

Figures 1, 2:
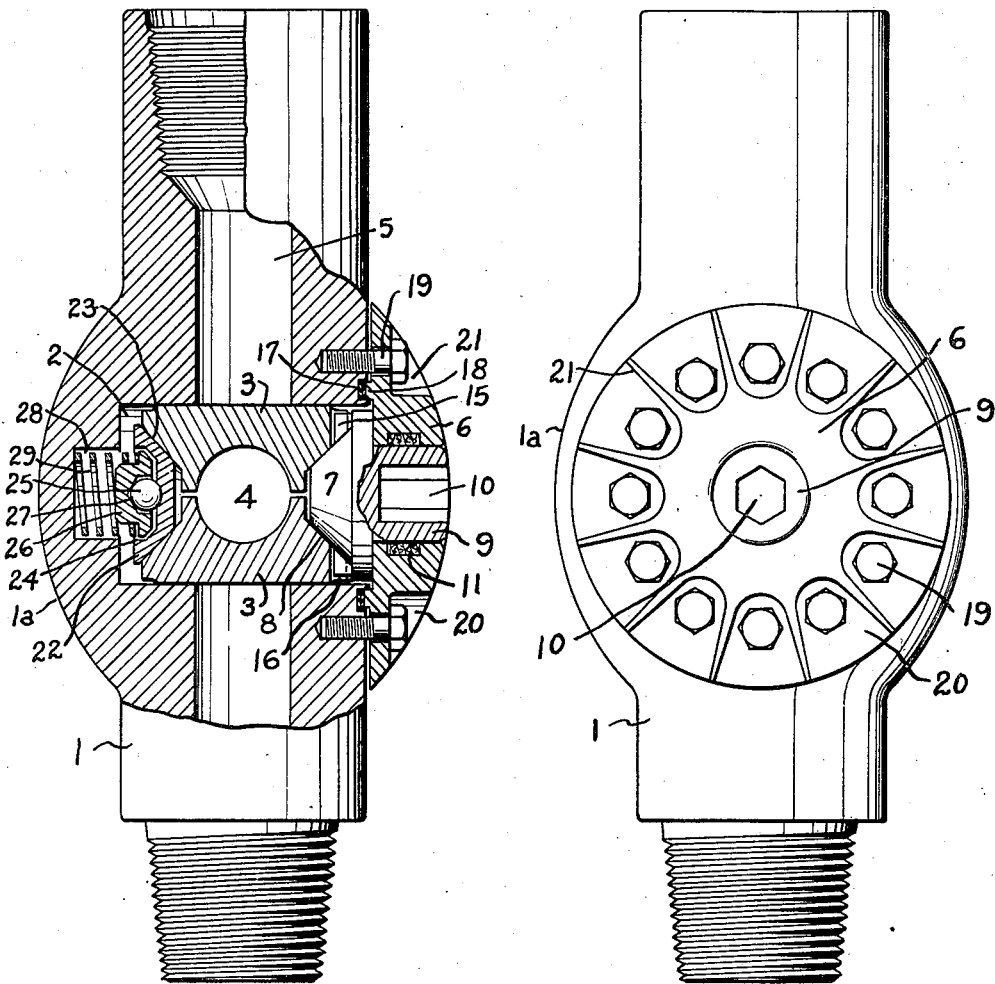
Figure 1 shows a vertical, sectional view of the valve.
Figure 2 shows a side elevation.

In the drawing, the numeral 1 designates the valve casing as a whole, said casing being in the form of a tubular coupling member whose lower end is threaded for connection to the upper end of the grief pipe and whose upper end is threaded for connection to the swivel. An intermediate portion 1a of the casing is approximately spherical in shape.

Within the spherical portion of the casing there is a transverse cylindrical bore 2 forming a valve seat in which there is a cylindrical shaped valve member formed of semi-cylindrical sections 3, 3 which are complementary as more accurately shown in Figure 1. The valve has a transverse passageway 4 therethrough arranged to be brought into and out of alignment with the passageway 5 which extends axially through the casing 1.

One end of the bore 2 is closed and its other end is covered by the cap 6 which forms a spherical segment being a complementary portion of the intermediate spherical portion 1a of the casing. There is a frusto-conical shaped expander 7 whose outer surface is plane and bears against the inner side of the cap 6 and whose inner tapering end is fitted into a correspondingly shaped recess 8 in the adjacent end of the valve member 3 and this expander has an outwardly extended stem 9 which is extended through the cap 6 and whose outer end may be flush with the outer surface of said cap and is provided with a socket 10 to receive a socket wrench for turning the valve. The stem 9 is surrounded by a suitable seal ring 11 which is countersunk into the cap and which forms a seal between the cap and stem around said stem. The expander 7 has the external keys as 15 which fit into keyways as 16 in the valve when the parts are assembled whereby upon rotation of the stem 9 the valve will be also turned.

The cap 6 is in sealed relation with the main body portion of the valve casing, the seal being formed by the annular seal ring 17 which is countersunk into said main body portion of the casing and against which an internal, annular rib 18, on the inside of the cap, bears. The cap is secured to the main body portion of the casing by means of the set bolts 19. It will be noted that around the margin of the cap there are the recesses 20 to receive the heads of said bolts, which heads do not project, appreciably, out beyond the external surface of the cap. Between the recesses 20 are the radiating fin-like guards 21 whose outer margins are flush with the external surface of the cap 6. These fin-like guards, or shields, prevent the cat line from hanging on the heads of the set bolts 19.

At the opposite end of the valve member there is a frusto-conical shaped expander 22 which fits into a correspondingly shaped recess 23 in the adjacent end of said valve member. This expander 22 has a socket 24 in its outer end to receive the anti-friction bearing 25 and the retainer 26 for said bearing. The inner side of this retainer has the recess 27 which conforms to the shape of the bearing 25 and maintains said bearing in place as indicated in Figure 1. The corresponding end of the bore, or seat, 2 has a reduced socket 28 in which there is located a coil spring 29 which bears against the retainer 26 and holds the spherical bearing 25 in yielding contact with the expander 22. The spring 29 is of sufficient strength to cause the expanders 22, 7 to expand the valve sections 3, 3 and to cause said valve to, at all times, fit closely against the walls of the bore 2.

It is obvious that by the application of a wrench to the valve stem the valve may be turned into position to close the passageway 5 as shown in Figure 1 with the passageway 4 extending at right angles to the passageway 5 or the valve may be turned to align said passageways to permit the flow of liquid through the valve casing and the drill stem to which it is connected.

Special attention is directed to the fact that the type of valve casing herein disclosed has a comparatively smooth external surface with no projections thereon on which a cat line would be liable to hang while being manipulated.

The drawing and description are illustrative merely, while the broad principle of the invention will be defined by the appended claims.

What we claim is:

1. A valve assembly comprising a tubular valve casing having an intermediate approximately spherical portion provided with a valve seat and including a spherical segment forming a cover for the seat and detachable, the external surface of the cover having recesses and guards between the recesses whose outer margins are approximately flush with the outer surface of the cover, means for securing the cover to the casing, the outer ends of the securing means being located wholly within said recesses, a valve in the seat for controlling the passageway through the casing, a valve stem operatively connected with the valve and having a bearing in, and being located wholly within, the cover.

2. A valve assembly comprising a tubular valve casing having an intermediate approximately spherical portion provided with a valve seat and including a spherical segment forming a cover for the seat and detachable, the external surface of the cover having marginal recesses and radial guards between the recesses whose outer margins are approximately flush with the outer surface of the cover, means for securing the cover to the casing, the outer ends of the securing means being located wholly within said recesses, a valve in the seat for controlling the passageway through the casing, a valve stem operatively connected with the valve and having a bearing in, and being located wholly within, the cover.

WALTER L. CHURCH.
WILLIAM K. HOLLERON.